March 11, 1924. 1,486,442
H. C. LORD
RESILIENT WHEEL
Filed Oct. 8, 1919
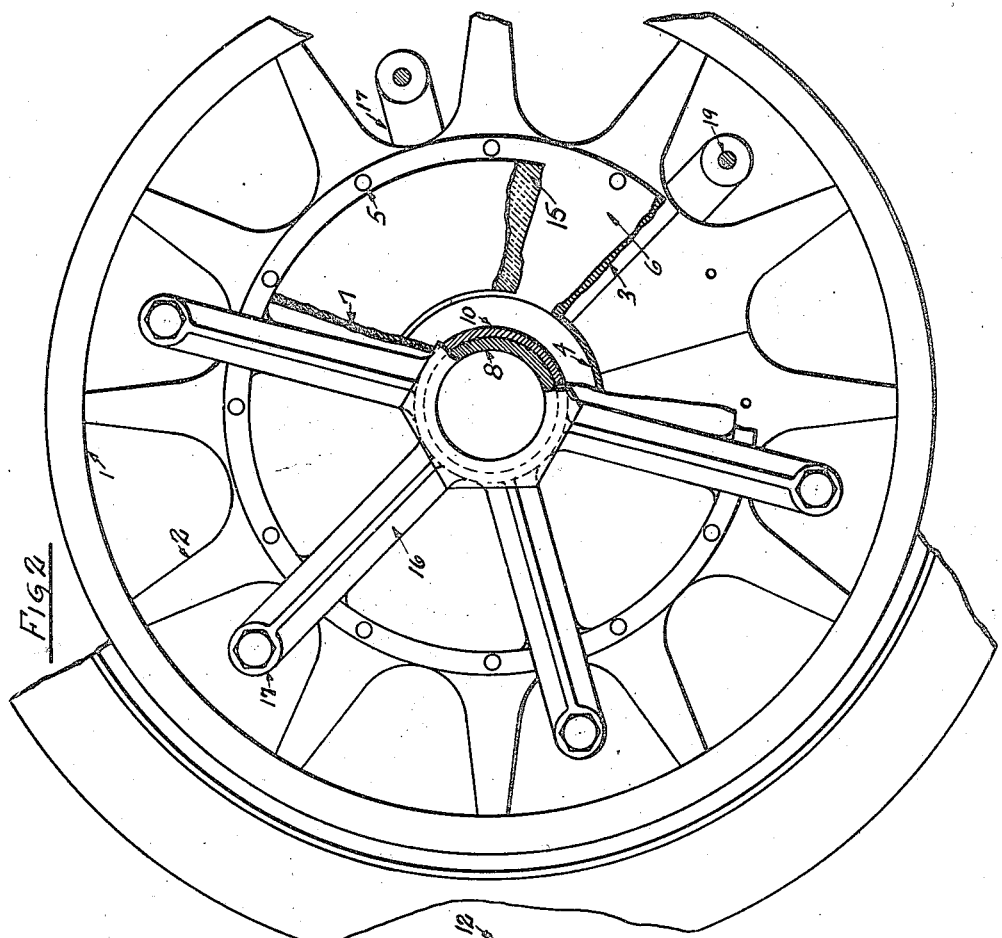
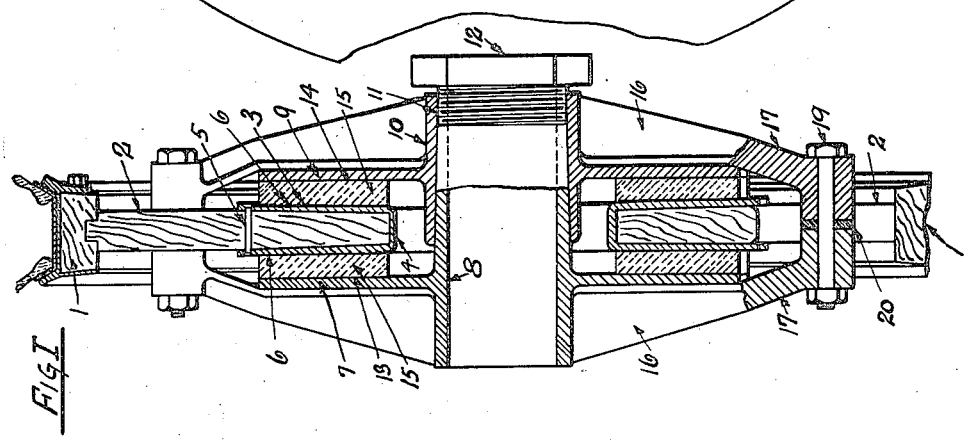
Inventor
Hugh C. Lord Patented Mar. 11, 1924.

1,486,442

UNITED STATES PATENT OFFICE.

HUGH C. LORD, OF ERIE, PENNSYLVANIA.

RESILIENT WHEEL.

Application filed October 8, 1919. Serial No. 329,239.

*To all whom it may concern:*

Be it known that I, HUGH C. LORD, a citizen of the United States, residing at Erie, in the county of Erie and State of Pennsylvania, have invented new and useful Improvements in Resilient Wheels, of which the following is a specification.

The invention is illustrated in the accompanying drawings as follows:—

Fig. 1 shows a central vertical section through the wheel.

Fig. 2 a side elevation, parts being broken away to better show construction.

1 marks the wheel rim or felloe, 2 the spokes, and 3 a spoke socket. The spoke socket has an annular ring U-shape in cross section, the two side flanges being preferably connected by the wall 4 at the inner periphery. The walls of the ring 3 are bolted or riveted together by bolts 5 along the outer periphery, thus securely clamping the spokes in place. Preferably the spoke socket formed by the ring is slightly tapered so that the spokes may be given a driven fit. The outer faces 6 of the spoke socket 3 are treated for the attachment of rubber. A flange 7 is opposed to one of the faces 6 and extends from a hub portion or sleeve 8. A flange 9 opposes the opposite face 6 and extends from a hub portion or sleeve 10 slidably mounted on the sleeve 8. The sleeve 10 is internally threaded at 11 and a sleeve nut 12 is screwed into the end of the sleeve 10 against the end of the sleeve 8 so that the distance between the flanges 7 and 9 may be adjusted if desired.

The faces 13 and 14 of the flanges 7 and 9 are suitably prepared for the attachment of rubber. Annular rings 15 of rubber are arranged between the faces 6 and 13 and 6 and 14.

Ordinarily the securing of rubber to metal is accomplished by a proper coating of the metal, especially if iron is used, so that there is a union between the coated metal and the rubber. This is particularly true where the rubber is vulcanized in place. Ordinarily the metal is provided with a slight plating, such as is provided by a copper dip, and then is coated with a suitable cement and the rubber vulcanized in place. There are many patents directed to the securing of rubber to metal and the particular manner of accomplishing this forms no part of this invention.

It will be observed that with the structure so far as described when the wheel is subjected to weight there is a tendency to move the spoke socket 3 relatively to the flanges 7 and 9 and in consequence there is a stretching of the interposed rubber. If the movement of the flanges is directly downward relatively to the socket which is maintained by the rim every portion of the rubber is stretched equally and in as much as this is the ordinary movement which is encountered it will be seen that the entire body of both rings of rubber is utilized for sustaining the shock. It will also be observed that this stretching is not uniform for a given relative movement but varies as the movement progresses—a given movement involving a greater stretch as the relative movement progresses. Consequently the cushion may be very short initially but increasing in resistance very rapidly as the movement progresses, thus making an ideal spring condition. The variation with a given movement of the parts, or members may be varied by varying the thickness of the rubber. The rubber may also, if desired, be given an initial tension. This is accomplished in the present structure by means of a nut 12. With this nut the flanges 7 and 9 may be separated, thus giving the rubber any initial tension that the circumstances may require.

The side thrust to which the wheel is subjected is slightly cushioned but a very slight movement sidewise is all that the rubber rings will permit. On the other hand the range of movement diametrically may be made very large if desired by simply increasing the thickness of the rubber. A considerable movement, however, may be had with comparatively thin rings of rubber.

It may be desirable to brace the flanges 7 and 9 at their outer ends. This may be conveniently accomplished by extending the ribs 16 arranged on the faces of the flanges by means of arms 17. The arms are perforated and the opposing arms are secured together by bolts 19. If the flanges have been separated by means of the screw 12 an insert 20 may be placed between the ends of the arms. It will be noted that the arms occupy openings between the spokes so that the rim is free to move in any direction relatively to the flanges, the openings between the spokes giving the necessary freedom of movement.

It will be observed that the resilient rubber members bridging the spaces between the flanges form a span, the outer ends of which are locked against movement toward each other so that with a radial movement of the movable member the increased distance between two directly opposite points on the outer ends of the span by way of the intervening space as it is flexed results in a linear stretch of the rubber forming the resilient member. The resilient member is also subjected to distortion laterally and the resistance to this lateral distortion also resists radial movement. The resistance due to linear stretching of the rubber increases in a desirable way as the stretching increases not only because of the increased resistance of the rubber as stretched but also by reason of the angle of the line of pull. It will also be observed that the rubber or resilient member is rigidly secured at its ends so that there are no frictional losses, the change in direction of the span to the faces of the flange being accomplished by the flexing of the span itself. This is a very important feature in wheel construction because the friction is obviously an entire loss and in a device of this type with constant movement any frictional action would tend to very rapid deterioration.

The rubber mounting between the opposing surfaces not only resists the side movement of the rim member by resistance to stretch but the rubber member on the side toward which the movement takes place yieldingly resists such movement after the rubber has reached the neutral point by resistance to compression.

What I claim as new is:—

1. In a wheel, the combination of a hub member; a rim member, said members comprising parts overlapping radially; a resilient member comprising an axially extending resilient span rigidly secured to and forming a span between overlapping parts of the rim and hub members; and means acting on the members locking the ends of the span against axial movement toward each other.

2. In a wheel, the combination of a hub member; a rim member, said members comprising parts overlapping radially; a resilient member comprising an axially extending resilient span of rubber rigidly secured to and forming a span between overlapping parts of the rim and hub members; and means acting on the members locking the ends of the span against axial movement toward each other.

3. In a wheel, the combination of a hub member; a rim member, said members being movable relatively to each other, one of said members comprising two radially extending flanges and the other of said members comprising one radially extending flange between the two radially extending flanges of the other member, said flanges being spaced apart axially; resilient members comprising axially extending resilient spans rigidly secured to opposing faces of said flanges and bridging the space therebetween and forming a span between the outside flanges; and means acting on the outside flanges locking the ends of the spans from axial movement toward each other.

4. In a wheel, the combination of a hub member; a rim member, said members being movable relatively to each other, one of said members comprising two radially extending flanges and the other of said members comprising one radially extending flange between the two radially extending flanges of the other member, said flanges being spaced apart axially; resilient members comprising axially extending resilient spans of rubber rigidly secured to opposing faces of said flanges and bridging the space therebetween and forming a span between the outside flanges; and means acting on the outside flanges locking the ends of the spans from axial movement toward each other.

5. In a wheel, the combination of a hub member; a rim member, said members being movable relatively to each other and comprising overlapping annular flanges spaced apart axially; a resilient member comprising an axially extending resilient span rigidly secured to and forming a span between the overlapping parts of the rim and hub members; and means acting on a flange for placing the span under initial tension and locking the ends of the span against axial movement toward each other the radial action of the rim member.

6. In a wheel, the combination of a rim member; an axle member, said members having opposing in an axial direction and faces spaced apart and movable, one across the other in a radial direction, with a relative movement of said members; a resilient member of rubber rigidly secured to said faces; and means for placing the resilient member under initial tension.

7. In a wheel, the combination of a rim member; an axle member, each of said members having a plurality of faces, each face opposing and spaced apart from a face on the other member in an axial direction, said opposing faces being movable one across the other in a radial direction with a relative movement of the members; resilient members of rubber bridging the spaces between the faces and rigidly secured to said faces; and means for placing the resilient members under initial tension.

8. In a wheel, the combination of a rim member; an axle member, said members having overlapping radial flanges spaced apart; rubber bridging the space between the flanges and rigidly secured to the flanges, the wheel load being carried by the rubber; and means for placing the rubber under initial tension.

9. In a wheel, the combination of a rim member; an axle member, one of said members having a plurality of radial flanges and the other member having a flange extending between said radial flanges and spaced therefrom; rubber bridging the space between the flanges and rigidly secured to said flanges, said rubber carrying the wheel load; and means acting on a flange for placing the rubber under initial tension.

10. In a wheel, the combination of a rim member comprising a radial flange; an axle member having a flange opposing one face of said rim member flange and having an axial sleeve from which the flange extends; a second radial flange at the opposite side of the rim member flange, said second flange having a sleeve slidably mounted with relation to the sleeve of the first flange; a screw operating in the end of one of said sleeves against the other of said sleeves for moving the flanges axially relatively to each other; and rubber members secured between the faces of said flanges.

In testimony whereof I have hereunto set my hand.

HUGH C. LORD.